(12) United States Patent
Weston et al.

(10) Patent No.: US 6,716,526 B2
(45) Date of Patent: Apr. 6, 2004

(54) PARTICULATE COMPOSITIONS AND THEIR MANUFACTURE

(75) Inventors: Rachel Clare Weston, Elland (GB); Howard Roger Dungworth, Halifax (GB)

(73) Assignee: Ciba Specialty Chemicals Water Treatments Ltd., Bradford (GB)

( * ) Notice: Subject to any disclaimer, the term of this patent is extended or adjusted under 35 U.S.C. 154(b) by 0 days.

(21) Appl. No.: 10/181,335

(22) PCT Filed: Jan. 16, 2001

(86) PCT No.: PCT/EP01/00429
§ 371 (c)(1), (2), (4) Date: Jul. 17, 2002

(87) PCT Pub. No.: WO01/54809
PCT Pub. Date: Aug. 2, 2001

(65) Prior Publication Data
US 2003/0018102 A1 Jan. 23, 2003

(30) Foreign Application Priority Data
Jan. 27, 2000 (GB) .............................................. 0001752

(51) Int. Cl.⁷ ............................ B32B 27/00; B05D 5/02; B05D 7/00
(52) U.S. Cl. .................. 428/402.2; 427/2.14; 427/162; 427/164; 427/212; 427/213.3
(58) Field of Search ................................. 427/2.14, 162, 427/164, 212, 213.3; 428/402.2, 34.2

(56) References Cited

U.S. PATENT DOCUMENTS

| | | | |
|---|---|---|---|
| 5,521,253 A | 5/1996 | Lee et al. | 525/301 |
| 5,536,756 A | 7/1996 | Kida et al. | 521/56 |

FOREIGN PATENT DOCUMENTS

| | | |
|---|---|---|
| EP | 0522791 | 1/1993 |
| EP | 0556367 | 8/1993 |
| EP | 0959176 | 11/1999 |

*Primary Examiner*—James J. Seidleck
*Assistant Examiner*—Thao Tran
(74) *Attorney, Agent, or Firm*—Tyler A. Stevenson

(57) ABSTRACT

A composition comprising particles which comprise a core material within a polymeric shell, wherein the core material comprises a hydrophobic substance, characterized in that the polymeric shell comprises a copolymer formed from a monomer blend which comprises, A) 30 to 90% by weight methacrylic acid B) 10 to 70% by weight alkyl ester of (meth)acrylic acid which is capable of forming a homopolymer of glass transition temperature in excess of 60° C. and C) 0 to 40% by weight other ethylenically unsaturated monomer. The core material can comprise an active ingredient selected from the group consisting of UV absorbers, UV reflectors, pigments, dyes, colorants, scale inhibitors, corrosion inhibitors, antioxidants, pour point depressants, wax deposition inhibitors, dispersants, flame retardants, biocides, active dye tracer materials and phase change materials. The composition has the advantage that the polymeric shell is highly impermeable to the core material even at elevated temperatures.

25 Claims, 1 Drawing Sheet

PARTICULATE COMPOSITIONS AND THEIR MANUFACTURE

Figure 1:
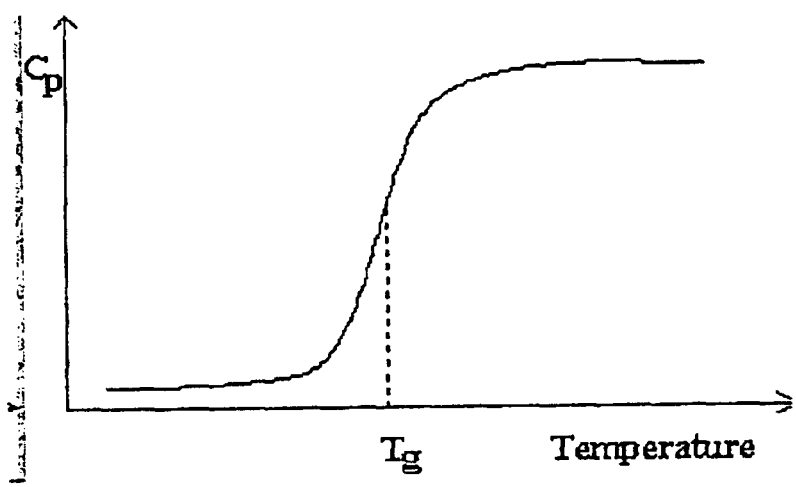

This invention relates to particulate compositions comprising a core of hydrophobic material within a shell of polymeric material and a process of producing said compositions. The invention also relates to novel articles comprising said compositions and in particular novel fibres comprising said compositions and a process for making said fibres. In the invention the core may comprise an active ingredient such as ultra violet (UV) absorbers, flame retardants or phase change substances. Desirably the particulate compositions can easily be incorporated into a variety of products such as coatings, sun-screens or a variety of textile products.

There are many instances where it would be desirable to provide capsules comprising a shell surrounding a core material. For instance the core may comprise an active ingredient which is released slowly, such as fragrances, pesticides, medicaments and the like. In other instances it may be desirable for the core material encapsulated within the shell to remain substantially intact either permanently or at least until a suitable trigger induces the core to be released. There are instances where it is important that the core material is not released from the capsules. This includes for example encapsulated ultra violet light absorbers for use in sunscreens and articles of clothing.

Another important application includes encapsulated phase change materials which can be used as thermal energy storage products. Such products include fabrics and especially clothing. Of particular value are for example microcapsules comprising a phase change hydrocarbon material which are combined with a fibre spinning dope, which is then extruded to form filaments which are cured and then collected. Since the spinning process normally requires passing the extruded dope into an environment at temperatures often in excess of say 150 or 200° C. and can be even as high as 350° C. or higher, it is desirable for substantially all of the core material to be retained in the shell. Fibres such as nylon and polyester fibres are produced by melt spun process, which generally involves very high temperatures, for instance in excess of 300 or 350° C. However, it is difficult to find the right chemistry that provides an impervious, durable shell wall that can be incorporated into fibres, without suffering deleterious effects during the spinning process.

Various methods for making capsules have been proposed in the literature. For instance it is known to encapsulate hydrophobic liquids by dispersing the hydrophobic liquid into an aqueous medium containing a melamine formaldehyde pre-condensate and then reducing the pH resulting in an impervious aminoplast resin shell wall surrounding the hydrophobic liquid. Variations of this type of process are described in GB-A-2073132, AU-A-27028/88 and GB-A-1507739, in which the capsules are preferably used to provide encapsulated inks for use in pressure sensitive carbonless copy paper.

However, although capsules based on melamine formaldehyde resins are both impervious and durable, they tend to suffer the disadvantage that they are less impermeable at elevated temperatures. In addition there is also a risk that at elevated temperatures formaldehyde is evolved.

WO-A-9924525 describes microcapsules containing as a core a lipophilic latent heat storage material with a phase transition at −20 to 120° C. The capsules are formed by polymerizing 30 to 100 wt. % $C_{1-24}$ alkyl ester of (meth) acrylic acid, up to 80 wt. % of a di- or multifunctional monomer and up to 40 wt. % of other monomers. The microcapsules are said to be used in mineral molded articles. However, the specific polymer compositions described would not be suitable for exposure to high temperatures since the lipophilic phase change material would be very quickly lost.

There exists a need for particles that comprise a substantially impervious shell wall that retains a hydrophobic material, especially at elevated temperatures. There is a particular need to provide such particles that do not release the core material even when exposed to the harsh conditions, for instance high temperature, high pressures and shearing conditions of producing synthetic fibres.

There also exists a need for particles that do not release the core material until there has been a suitable release trigger, for instance pH. Nevertheless, the core material would not be released in the absence of the trigger. There is also a need to achieve all of these objectives but avoiding the use of formaldehyde condensation products.

Thus according to the present invention we provide a composition comprising particles which comprise a core material within a polymeric shell, wherein the core material comprises a hydrophobic substance, characterized in that the polymeric shell comprises a copolymer formed from a monomer blend which comprises, A) 30 to 90% by weight methacrylic acid B) 10 to 70% by weight alkyl ester of (meth)acrylic acid which is capable of forming a homopolymer of glass transition temperature in excess of 60° C. and C) 0 to 40% by weight other ethylenically unsaturated monomer.

Also included in the present invention is a process of manufacturing a composition comprising particles which comprise a core material within a polymeric shell, wherein the core material comprises a hydrophobic substance, comprising the steps, 1) forming a solution of monomer in the hydrophobic liquid, 2) homogenising the monomer solution into an aqueous phase to form an emulsion, 3) subjecting the emulsion to polymerization conditions, and 4) forming a dispersion of polymeric particles in the aqueous phase characterized in that the polymeric shell comprises a copolymer formed from a monomer blend which comprises, A) 30 to 90% by weight methacrylic acid B) 10 to 70% by weight alkyl ester of (meth)acrylic acid which is capable of forming a homopolymer of glass transition temperature in excess of 60° C. and C) 0 to 40% by weight other ethylenically unsaturated monomer.

The process may employ an emulsifying system, for instance emulsifiers, other surfactants and/or polymerization stabilizers. Thus in a preferred form of the invention an emulsifier, which may have a high HLB is dissolved into water prior to emulsification of the monomer solution. Alternatively the monomer solution may be emulsified into water with a polymerization stabilizer dissolved therein. The polymerisation stabiliser can be a hydrophilic polymer, for example a polymer containing pendant hydroxyl groups, for instance a polyvinyl alcohol and hydroxyethylcellulose. Generally it is preferred to use polyvinyl alcohol which has been derived from polyvinyl acetate, wherein between 85 and 95%, preferably 90% of the vinyl acetate groups have been hydrolysed to vinyl alcohol units. The polymerisation step may be effected by subjecting the aqueous monomer solution to any conventional polymerisation conditions. Generally polymerisation is effected by the use of suitable initiator compounds. Desirably this may be achieved by the use of redox initiators and/or thermal initiators. Typically redox initiators include a reducing agent such as sodium sulphite, sulphur dioxide and an oxidising compound such as ammonium persulphate or a suitable peroxy compound, such as tertiary butyl hydroperoxide etc. Redox initiation may employ up to 1000 ppm, typically in the range 1 to 100 ppm, normally in the range 4 to 50 ppm.

Preferably the polymerisation step is effected by employing a thermal initiator alone or in combination with other initiator systems, for instance redox initiators. Thermal initiators would include any suitable initiator compound that releases radicals at an elevated temperature, for instance azo compounds, such as azobisisobutyronitrile (AZDN), 4,4'-azobis-(4-cyanovalereic acid) (ACVA) or t-butyl perpivilate. Typically thermal initiators are used in an amount of up to 50,000 ppm, based on weight of monomer. In most cases, however, thermal initiators are used in the range 5,000 to 15,000 ppm, preferably around 10,000 ppm. Preferably a suitable thermal initiator with the monomer prior to emulsification and polymerisation is effected by heating the emulsion to a suitable temperature, for instance 50 or 60° C. or higher.

We have found that polymers formed from the special combination of methacrylic acid and the specific category of (meth) acrylic esters that are capable of forming a homopolymer of glass transition temperature in excess of 60° C. exhibit considerably improved performance in regard to the impermeability to the core material, especially at elevated temperatures. Capsules formed from the defined proportions of methacrylic acid and said (meth) acrylic esters have been shown to retain significantly more hydrophobic material than other copolymers where one or both of these monomers are replaced.

Glass transition temperature (Tg) for a polymer is defined in the Encyclopedia of Chemical Technology, Volume 19, fourth edition, page 891 as the temperature below which (1) the transitional motion of entire molecules and (2) the coiling and uncoiling of 40 to 50 carbon atom segments of chains are both frozen. Thus below its Tg a polymer would not to exhibit flow or rubber elasticity. The Tg of a polymer may be determined using Differential Scanning Calorimetry (DSC). Thus a reference sample with known Tg and the experimental sample are heated separately but in parallel according to a linear temperature programme. The two heaters maintain the two samples at identical temperatures. The power supplied to the two heaters to achieve this is monitored and the difference between them plotted as a function of reference temperature which translates as a recording of the specific heat as a function of temperature. As the reference temperature is increased or decreased and the experimental sample approaches a transition the amount of heat required to maintain the temperature will be greater or lesser depending on whether the transition is endothermic or exothermic. A typical plot indicating the glass transition temperature is shown in FIG. 1.

The composition of the present invention may comprise particles in which the average particle size diameter is less than 10 microns. Generally the average particle size diameter tends to be much smaller, often less than 2 microns and typically the average particle diameter will be between 200 nm and 2 microns. Preferably the average particle size diameter is in the range 500 nm and 1.5 microns usually around 1 micron. Average particle size is determined by a Coulter particle size analyser according to standard procedures well documented in the literature.

Without being limited to theory it is believed that the particular combination of methacrylic acid and said (meth) acrylic esters provides polymers with the right degree of hydrophilicity and hardness that seems to be responsible for the improvements in impermeability to the hydrophobic core material.

Thus it is essential to the invention that the polymeric shell of the particles are formed from between 30 and 90% by weight methacrylic acid. It has been found that polymers greater than 90% methacrylic acid or less than 30% methacrylic acid exhibit unacceptable permeability.

In addition it is important to the invention that the polymer is formed from between 10 and 70% by weight of the specific category of (meth)acrylic esters, defined as monomers that are capable of forming a homopolymer that has a glass transition temperature (Tg) of at least 60° C., preferably at least 80° C. Specific examples of said (meth) acrylic monomers include methyl methacrylate, tertiary butyl methacrylate, phenyl methacrylate, cyclohexyl methacrylate and isobornyl methacrylate.

It has been found that it is not possible to replace the (meth) acrylic acid esters with ethylenically unsaturated carboxylic acid esters that are not capable of forming a hompolymer that has a glass transition temperature of at least 60° C. without adversely increasing the permeability of the polymer. For instance substituting the (meth)acrylic esters of the present invention by other (meth)acrylic esters, for instance ethyl acrylate or propyl acrylate would not produce the desired polymer.

Therefore in a preferred form of the invention we claim a composition wherein the copolymer is formed from a monomer blend which comprises, A) 40 to 90%, preferably 45 to 90% by weight (meth) acrylic acid B) 10 to 60%, preferably 10 to 55% by weight alkyl ester of (meth)acrylic acid which is capable of forming a homopolymer of glass transition temperature in excess of 60° C. and C) 0 to 40, preferably 0 to 20% by weight other ethylenically unsaturated monomer.

The polymer of the present invention comprises 0 to 40% by weight other ethylenically unsaturated monomers. Typically this monomer may be any ethylenically unsaturated monomer that does not exert a deleterious effect on the performance of the polymer. Typically these other monomers include esters selected from the group consisting of an ethylenically unsaturated carboxylic acid and salts thereof, amino alkyl esters of ethylenically unsaturated carboxylic acid and salts thereof, $C_{1-30}$ esters of ethylenically unsaturated carboxylic acid, styrene, acrylonitrile, vinyl acetate and cross-linking monomers. Preferably the polymer comprises less than 20% of other monomers. Generally the polymer of the present invention contains less than 5 or 10% by weight other monomers and most preferably the polymer contains substantially no additional monomer.

It may be desirable for the polymeric shell to be cross-linked. Generally this would be achieved by including a suitable cross-linking monomer in the monomer mixture. Typically the cross-linking monomer includes di- or multi-functional monomers, which would usually bear at least two ethylenically unsaturated groups. The cross-linking monomer may be any suitable monomer compatible with the monomer mixture and which does not detract from the desired properties of the polymer, especially with respect to an undesirable increase in permeability towards to the core material. Particularly suitable monomers include divinyl benzene, polyethylene glycol di(meth)acrylate, triallylamine and methylenebisacrylamide. Particularly preferred is divinyl benzene. Suitable cross-linking monomers may be used in any amount up to 40% by weight, for example as the sole additional monomer. Alternatively the cross-linking monomer may be used in addition to other additional monomers. Preferably the cross-linking monomer may be used in any amount up to 20 or 30% by weight. Generally the amount of cross-linking monomer is less that 5 or 10%. Most preferably the monomer mixture does not contain any substantial amount of cross-linking monomer.

Thus in an especially preferred form of the invention we claim a composition wherein the copolymer is formed from a monomer blend which consists essentially of, A) 45 to 90% by weight (meth)acrylic acid and
B) 10 to 55% by weight alkyl ester of (meth)acrylic acid which is capable of forming a homopolymer of glass transition temperature in excess of 60° C., preferably above 80° C. Most preferably this acrylic ester is selected from the group consisting essentially of methyl methacrylate, tertiary butyl methacrylate, phenyl methacrylate, cyclohexyl methacrylate and isobornyl methacrylate.

The composition of the present invention provides a particulate composition comprising core material within a polymeric shell, wherein the core material comprises a hydrophobic substance polymeric material. Desirably a substantial proportion of the core consists of the hydrophobic substance. Other materials may be included in the core, for instance additives which modify the properties of the hydrophobic substance. The other materials present in the core material may be hydrophilic and suspended in the hydrophobic substance, for instance inorganic salt hydrates. Alternatively the other additives may be polymeric additives which are miscible or soluble in the hydrophobic substance. Generally where included in the core these other materials will form no more than 10% by weight of the total core material. Often the other materials form less than 5% of the core normally less than 2%, for instance 0.5 to 1.5%. Thus the core will generally comprise at least 90% of the hydrophobic substance. Preferably the amount of hydrophobic substance comprised in the core will be more than 95% by weight, more preferably more than 98%, in particular 98.5 to 99.5%.

The core material may comprise an active ingredient selected from the group consisting of UV absorbers, UV reflectors, flame retardants, active dye tracer materials, pigments, dyes, colorants, enzymes, detergent builders and fragrances. Generally within the context of the present invention it would be unnecessary for the active ingredient to be released. For instance encapsulated pigments may be used in pigmented articles, such as ceramics, where it would be important for the pigment not to be released. There is also an application for encapsulated colorants, i.e. dyes and pigments for many other applications, for instance in preparing textile products. Thus the particles comprising a pigment or dye can be incorporated into or adhered to a fibre or textile article. The color would be held by the particle and there would be no risk of color leaching. Alternatively the encapsulated colorant may be applied to packaging materials, for instance food packaging. Thus shaded paper or board used in food packaging may be prepared by including the encapsulated pigments or dyes into the paper making process. Typically the colorants can be C.I. Pigment Violet 19, C.I. Pigment Blue 15, C.I. Pigment Blue 60, C.I. Pigment Red 177 as described in WO-A-00/61689

Alternative applications of encapsulated pigments includes cosmetics, for instance as described in U.S. Pat. Nos. 5,382,433, 5,320,835 or WO-A-98/50002. Typically the colorants can be mica, talc, D&C Red 7 Calcium Lake, D&C Red 6 Barium Lake, Iron Oxide Red, Iron Oxide Yellow, D&C Red 6 Barfum Lake, Timiron MP-1001, Mineral (Carnation White), Helindon Pink, Red 218, Japan Blue No.1 Al lake, Polysiloxane-treated Titanium mica.

In a further aspect of the invention we provide particles which no not release the core material and/or active ingredient until a suitable trigger mechanism has occurred. In this case the trigger is an increase in pH to above pH 10.

Thus such alkali releasable particles may be applied in a variety of applications where the use of high pH may be used as a release mechanism. In one application the active ingredient may be for instance a lipophilic compound that is soluble in refined or crude oil, and examples of oil containing environments into which it is to be released include downhole and pipeline. Desirably such lipophilic compounds are selected from wax deposition inhibitors, pour point depressants, demulsifiers, scale inhibitors corrosion inhibitors, biocides, enzymes, surfactants, antioxidants. The particles will desirably release the active ingredient upon increasing the pH to above pH 10. Thus the particles may be injected into a subterranean reservoir under neutral of acid conditions. The capsules may release the active ingredient upon subsequent injection of aqueous alkali, for example as part of an alkali flooding process.

The active ingredient may also be a substance that is to be released in to an aqueous environment. This may be recirculating water such as in cooling water systems, which are normally operated under alkali conditions. Suitable actives for release into aqueous systems include antiscalents, corrosion inhibitors, biocides, dispersants, and antioxidants.

Generally the hydrophobic substance comprised in the core may be an organic material. For instance the hydrophobic substance may be an oil or a wax. Preferably the hydrophobic substance is a non-polymeric material. The oil or wax may contain active materials, such as UV absorbers, UV reflectors, or flame retardants dispersed or dissolved therein. Thus the core material may a homogenous or alternatively may comprise a dispersion of solid active material dispersed throughout a continuous core medium of hydrophobic substance. When the core material comprises a phase change material, generally the phase change material is an oil or a wax which is liquid at a temperature between −30° C. and 150° C.

Typical examples of flame retardants suitable for the present invention include bromobenzoates as described in U.S. Pat. No. 5,728,760 and halogenated phosphates, thiophosphates or thiophosphoryl chlorides as given in U.S. Pat. No. 3,912,792.

Suitable ultra violet light absorbers of the present invention include naphthalene-methylenemalonic diesters, for instance as mentioned in U.S. Pat. No. 5,508,025 or compositions comprising mixtures of benzotriazoles and 2-hydroxy benzophenones as claimed by U.S. Pat. No. 5,498,345.

When the core material is a phase change substance it may be for instance any known hydrocarbon that melts at a temperature of between −30 and 150° C. Generally the substance is a wax or an oil and preferably has a melting point at between 20 and 80° C., often around 40° C. Desirably the phase change substance may be a $C_{8-40}$ alkane or may be a cycloalkane. Suitable phase change materials includes all isomers of the alkanes or cycloalkanes. In addition it may also be desirably to use mixtures of these alkanes or cycloalkanes. The phase change material may be for instance any of the compounds selected from n-octadecane, n-tetradecane, n-pentadecance, n-heptadecane, n-octadecane, n-nonadecane, n-docosane, n-tricosane, n-pentacosane, n-hexacosane, cyclohexane, cyclooctane, cyclodecane and also isomers and/or mixtures thereof.

In a preferred form of the invention the core consists essentially of a hydrophobic substance, for instance at least 90%, which is a non-polymeric material, for instance an oil or wax, in particular a phase change material. Although the preferred hydrophobic substance is a phase change material which is essentially non-polymeric, it is within the scope of the present invention for a smaller amounts of polymeric additives to be included within the phase change non-polymeric material. Usually this will be in amounts of less than 10% by total weight of core and often will be less than 5, for instance 0.5 to 1.5 or 2% by weight. A particularly desirable polymeric additive is a substance that will modify the properties of the phase change material. For instance it is known that the temperature at which a phase change material melts on absorbing heat can be significantly different from the temperature at which it solidifies when losing heat. Thus a particularly desirable polymeric additive would be a substance which will bring the melting and solidifying temperatures closer together. This minimization of the shift in melting/freezing point of the phase change material may be important in various domestic applications or for garments.

Alternatively the phase change material comprised in the core could be a substance other than a hydrocarbon. The phase change material could be an inorganic substance that absorbs and desorbs latent heat during a liquefying and solidifying phase transition. The inorganic substance may be a compound which releases or absorbs heat during a dissolving/crystallization transition. Such inorganic compounds include for instance sodium sulphate decahydrate or calcium chloride hexahydrate. Thus the inorganic phase change material may be any inorganic substance that can absorb or desorb thermal energy during a transition at a particular temperature. The inorganic phase change material may be in the form of finely dispersed crystals which are dispersed throughout the core matrix which comprises a hydrophobic substance. In one form the inorganic phase change material is dispersed throughout a solid hydrophobic substance such as a wax. Alternatively the hydrophobic substance comprised in the core remains substantially liquid and contains crystals of the inorganic phase change material dispersed throughout the liquid. Preferably the hydrophobic liquid is a hydrocarbon. During a phase change the crystals become liquid droplets dispersed throughout the liquid. It may be advantageous to include a suitable surfactant, such as a water in oil emulsifier into the hydrophobic liquid in order to prevent coalescence of the dispersed droplets of liquid. Preferably the inorganic phase change material is dispersed throughout a matrix of hydrocarbon phase change material which is a wax or an oil. In this preferred embodiment the hydrocarbon and inorganic materials may both absorb or desorb heat. Alternatively the hydrocarbon phase may be a carrier oil that is not necessarily a phase change material. In this instance the carrier oil may be a process aid.

According to the present invention we have found that it is possible to produce a particulate composition comprising a core material held within a polymeric shell, which at least 98% of the core material is retained when exposing the particulate composition to a temperature of 200° C. for 15 minutes. In general the particulate material will retain at least 98%, 99% or even 100% of the core material on exposure to a temperature of 200° C. for 15 minutes. Thus we provide a particulate composition in which none or virtually none of the core material is lost when exposed to elevated temperatures.

It is possible to incorporate the particles of the present invention into any suitable article, for instance fibres, textile products, ceramics, coatings etc. Thus a further aspect of the present invention we provide an article comprising particles with a core of core material and a polymeric shell. Hence according to the invention it is possible to provide an article which comprises encapsulated flame retardants, UV absorbers, active dye tracer materials or phase change material. In the case of encapsulated flame retardants it would be desirable for the flame retardant to be retained during any processing steps such as fibre formation, involving temperatures of say between 150° C. to about 350° C. but then released when exposed to the excessive temperatures in excess of say above 400 or 500° C. In a preferred embodiment of the invention the polymer particles comprise a core material that contains both a phase change material, which is a wax or an oil and dispersed or dissolved therein a flame retarding substance. Thus in one preferred form of the invention the presence of the flame retardant in the capsule would prevent or reduce the risk of phase change material from igniting if released under excessive temperatures.

Particularly important articles according to this aspect of the invention are fibres and fabrics formed from said fibres, wherein the fibres comprise particles of the present invention composition each comprising core material within a polymeric shell, wherein the core material comprises a hydrophobic substance. In this aspect of the invention the fibres comprise said particles distributed within the matrix of the fibre. Generally the diameters of the particles should be less than half of the cross-sectional diameter of the fibre. Generally if the particles are much larger there is a risk that the presence of such large particles in the fibres could result in the fibres which tend to break at the position of the particle. Typically the particles will have a particle size diameter less than 30%, preferably less than 10% of the diameter of the fibre.

The fibres comprising the particles of the present invention are made my incorporating the particles into the spinning dope. The spinning dope can then be spun according to standard spinning techniques, for instance as described in EP-A-269393. Generally the spinning dope is then passed through an orifice into a heated atmosphere where the extruded dope is cured to form a fibre, which is then collected.

The particles comprised in the composition of the present invention are suitable for incorporating into any fibres, for instance acrylics, polyesters, nylon, polypropylene.

According to this aspect of the invention we provide a process of forming a fibre containing particles comprising a core material within a polymeric shell wherein the core material comprises a hydrophobic substance comprising the steps of, 1) combining said particles with a liquid spinning dope,
2) extruding the spinning dope,
3) passing extruded dope through an atmosphere at a temperature of at least 150° C. and
4) collecting formed fibres, characterized and wherein the polymeric shell that has been formed from a copolymer derived from a monomer blend which comprises, A) 30 to 90% by weight methacrylic acid
B) 10 to 70% by weight alkyl ester of (meth)acrylic acid which is capable of forming a homopolymer of glass transition temperature in excess of 60° C. and 0 to 40% by weight other ethylenically unsaturated monomer.

Desirably the polymeric particles are sufficiently impermeable to the hydrophobic substance contained in the core so that during the formation of the fibre the high temperature conditions do not result in any significant loss of the hydrophobic substance. We have surprisingly found that the core material is able to retain most or all of the core material even when the polymeric particles are exposed to a spinning temperature in excess of 150° C. This has also been found to be the case even when the spinning temperature is much higher, for instance in excess of 200° C. Thus we find that the particles retain at least 98% by weight, preferably 99%, of the hydrophobic substance when passed though the spinning process.

A particularly important application of the present invention relates to incorporation of particles in fibres, which particles contain a phase change substance as the core material. The durability and impermeability of the polymeric shell towards the phase change material enables the particles to be incorporated into fibres without any significant loss of the phase change material. The impregnated fibres containing phase change material can then be woven into textile products. The textile products can include items of clothing and other fabrics.

The present invention also contemplates applying a dispersion of the encapsulated material onto the fibres or preferably onto the textile products. This would normally be followed by drying to remove the carrier liquid. Typically the carrier liquid may be an aqueous liquid, optionally containing volatile water miscible organic liquid, to assist the drying process. The coating formulation comprising said capsules may additionally contain other additives, for instance binders. The drying process would normally involve subjecting the fibre or textile product to an atmosphere which has an elevated temperature, often above 80° C., and may be for instance as high as 140 to 170° C. or higher. Such coating processes are well known and described in the prior art.

The following examples illustrate the invention.

EXAMPLE 1

An oil phase is prepared by mixing together blend of methacrylic acid and methyl methacrylate (40:60 wt/wt) (60 g) with octadecane (140 g) and tertiary butyl perpivilate (thermal initiator). The oil phase is homogenized into water (660 g) containing polyvinyl alcohol (Gohsenol GH20) (20 g) using a Silverson mixer for 5 minutes until a stable emulsion is formed. The emulsion is then transferred into a reactor with stirrer, thermometer and nitrogen supply and deoxygenated with nitrogen for 30 minutes. The contents of the reactor are then heated to 60° C. and maintained at this temperature for 2 hours after which the contents are heated to 80° C. and then maintained for a further 1 hour before being cooled and filtered. The resulting emulsion contains polymeric particles each comprising a polymeric shell encapsulating the octadecane wax having a solids content of 25.0% and a particle size of 1.2 microns.

The particles of encapsulated wax are then subjected to temperatures of 150° C. for 15 and 30 minutes and 200° C. for 15 and 30 minutes. The percentage weight loss was measured by thermo-gravimetric analysis (TGA) and the results are shown in Table 1.

EXAMPLES 2 to 7

Example 1 is repeated using different ratios of methyl methacrylate and methacrylic acid. In each case the results showing the weight loss are presented in Table 1.

TABLE 1

| Example | Copolymer Composition MMA:MAA | % Wax | % weight loss @ 150° C. for 15 minutes | % weight loss @ 150° C. for 30 minutes | % weight loss @ 200° C. for 15 minutes | % weight loss @ 200° C. for 30 minutes |
|---|---|---|---|---|---|---|
| 1 | 40:60 | 80 | 0 | 0 | 0.9 | 1.7 |
| 2 | 50:50 | 70 | 0 | 0 | 1.2 | 2.6 |
| 3 | 60:40 | 80 | 0 | 0.1 | 0.5 | 0.8 |
| 4 | 70:30 | 70 | 0 | 0.1 | 2.0 | 2.5 |
| 5 | 80:20 | 80 | 0.1 | 0.1 | 3.0 | 6.2 |
| 6 | 90:10 | 70 | 0.2 | 0.4 | 8.5 | 16.8 |
| 7 | 100:0 | 80 | 0.9 | 1.8 | 16.5 | 22.3 |

MMA - methyl methacrylate
MAA - methacrylic acid

From the results it can clearly be seen that the results in Table 1 Examples 1 to 4 give the best results, especially at 200° C.

What is claimed is:

1. A composition comprising particles which comprise a core material within a polymeric shell, wherein the core material comprises a hydrophobic substance, characterized in that the polymeric shell comprises a copolymer formed from a monomer blend which comprises,
   A) 30 to 90% by weight methacrylic acid
   B) 10 to 70% by weight alkyl ester of (meth)acrylic acid which is capable of forming a homopolymer of glass transition temperature in excess of 60° C. and
   C) 0 to 40% by weight other ethylenically unsaturated monomer.

2. A composition according to claim 1 in which component B is an alkyl ester of (meth)acrylic acid which is capable of forming a homopolymer of glass transition temperature in excess of 80° C.

3. A composition according to claim 1 in which component B of the monomer blend is selected from the group consisting of methyl methacrylate, acrylonitrile, tertiary butyl methacrylate, phenyl methacrylate, cyclohexyl methacrylate and isobornyl methacrylate.

4. A composition according to claim 1 in which component C is selected from the group consisting of an ethylenically unsaturated carboxylic acid and salts thereof, amino alkyl esters of ethylenically unsaturated carboxylic acid and salts thereof, $C_{1-30}$ esters of ethylenically unsaturated carboxylic acid, styrene, vinyl acetate and cross-linking monomer.

5. A composition according to claim 1 in which the copolymer is formed from a monomer blend which comprises 40 to 90% of component A and 10 to 60% of component B.

6. A composition according to claim 1 in which the copolymer is formed from a monomer blend which comprises 45 to 90% by weight component A and 10 to 55% of component B.

7. A composition according to claim 1 in which the polymeric shell comprises a copolymer consisting essentially of, 45 to 90% by weight component A and 10 to 55% by weight of component B.

8. A composition according to claim 1 in which the core consists essentially of at least 90% by weight of the of the hydrophobic substance.

9. A composition according to claim 1 in which the hydrophobic substance is a non-polymeric material.

10. A composition according to claim 1 in which the hydrophobic substance which is an oil or wax which has a melting point at a temperature between −30° C. and 150° C.

11. A composition according to claim 1 in which the core material comprises an active ingredient selected from the group consisting of UV absorbers, UV reflectors, flame retardants, active dye tracer materials, pigments, dyes, colorants, scale inhibitors, corrosion inhibitors, antioxidants, pour point depressants, wax deposition inhibitors, dispersants, biocides, enzymes, detergent builders, fragrances, phase change materials and silicone oils.

12. A process of manufacturing a composition comprising particles, which comprise core material within a polymeric shell, wherein the core material comprises a hydrophobic substance, comprising the steps,
   1) forming a solution of monomer in a hydrophobic liquid,
   2) homogenizing the monomer solution into an aqueous phase to form an emulsion,
   3) subjecting the emulsion to polymerization conditions, and
   4) forming a dispersion of polymeric particles in the aqueous phase characterized in that the polymeric shell comprises a copolymer formed from a monomer blend which comprises,
      A) 30 to 90% by weight methacrylic acid
      B) 10 to 70% by weight alkyl ester of (meth)acrylic acid which is capable of forming a homopolymer of glass transition temperature in excess of 60° C. and
      C) 0 to 40% by weight other ethylenically unsaturated monomer.

13. A process according to claim 12 in which the copolymer is formed from a monomer blend which comprises, 40 to 90% by weight of component A and 10 to 60% by weight of component B.

14. A process according to claim 12 in which component B is an alkyl ester of (meth)acrylic acid which is capable of forming a homopolymer of glass transition temperature in excess of 80° C.

15. A process according to claim 12 in which component B is selected from the group consisting of methyl methacrylate, acrylonitrile, tertiary butyl methacrylate, phenyl methacrylate, cyclohexyl methacrylate and isobornyl methacrylate.

16. A process according to claim 12 in which component C is selected from the group consisting of an ethylenically unsaturated carboxylic acid and salts thereof, amino alkyl esters of ethylenically unsaturated carboxylic acid and salts thereof, $C_{1-30}$ esters of ethylenically unsaturated carboxylic acid, styrene vinyl acetate and cross-linking monomer.

17. A process according to claim 12 in which the shell comprises a copolymer consisting essentially of 45 to 90% by weight of component A and 10 to 55% by weight of component B.

18. A process accordipg to claim 12 in which the core consists essentially of at least 90% by weight of the hydrophobic substance.

19. A process according to claim 12 in which the hydrophobic substance is a non-polymeric material.

20. A process according to claim 12 in which the hydrophobic substance which is an oil or wax which has a melting point at a temperature between −30° C. and 150° C.

21. A process according to claim 12 in which the core material comprises an active ingredient selected from the group consisting of UV absorbers, UV reflectors, pigments, dyes, colorants, scale inhibitors, corrosion inhibitors, biocides, enzymes, detergent builders, fragrances, antioxidants, pour point depressants, wax deposition inhibitors, dispersants, flame retardants, active dye tracer materials, phase change materials and silicone oils.

22. An article comprising a particulate composition comprising a polymeric shell, in which the core material comprises a hydrophobic substance, characterized in that the polymeric shell comprises a copolymer formed from a monomer blend which comprises,
   A) 30 to 90% by weight methacrylic acid
   B) 10 to 70% by weight alkyl ester of (meth)acrylic acid which is capable of forming a homopolymer of glass transition temperature in excess of 60° C. and
   C) 0 to 40% by weight other ethylenically unsaturated monomer.

23. An article according to claim 22 which is a textile product or a paper or board packaging material.

24. A fiber which comprises a particulate composition comprising a polymeric shell, in which the core material comprises a hydrophobic substance, characterized in that the polymeric shell comprises a copolymer formed from a monomer blend which comprises,
   A) 30 to 90% by weight methacrylic acid
   B) 10 to 70% by weight alkyl ester of (meth)acrylic acid which is capable of forming a homopolymer of glass transition temperature in excess of 60° C. and
   C) 0 to 40% by weight other ethylenically unsaturated monomer.

25. A process of forming a fiber containing particles comprising a core material within a polymeric shell in which the core material comprises a hydrophobic substance comprising the steps of,
   1) combining said particles with a liquid spinning dope,
   2) extruding the spinning dope,
   3) passing extruded dope through an atmosphere at a temperature of at least 150° C. and
   4) collecting formed fibers,
characterized and wherein the polymeric shell that has been formed from a copolymer derived from a monomer blend which comprises,
   A) 30 to 90% by weight methacrylic acid
   B) 10 to 70% by weight alkyl ester of (meth)acrylic acid which is capable of forming a homopolymer of glass transition temperature in excess of 60° C. and 0 to 40% by weight other ethylenically unsaturated monomer.

* * * * *